United States Patent [19]
Smith et al.

[11] Patent Number: 5,992,267
[45] Date of Patent: Nov. 30, 1999

[54] ROBUST CONTROL FOR THREE-POSITION TRANSMISSION SHIFT ACTUATOR ASSEMBLY

[75] Inventors: Gerard F. Smith; Michael J. Huggins; Alan C. Stine; David L. Wadas, all of Kalamazoo, Mich.

[73] Assignee: Eaton Corporation, Cleveland, Ohio

[21] Appl. No.: 09/178,346

[22] Filed: Oct. 26, 1998

[51] Int. Cl.⁶ .................................................. F16H 59/08
[52] U.S. Cl. ................................................. 74/745; 74/335
[58] Field of Search ....................................... 74/745, 335

[56] References Cited

U.S. PATENT DOCUMENTS

| | | | |
|---|---|---|---|
| 4,748,863 | 6/1988 | McNinch, Jr. | 74/335 |
| 5,144,863 | 9/1992 | Wood | 74/745 |
| 5,172,604 | 12/1992 | Monette et al. | 74/335 |
| 5,390,561 | 2/1995 | Stine | 74/331 |
| 5,528,949 | 6/1996 | Stainton et al. | 74/335 |
| 5,651,292 | 7/1997 | Genise | 74/745 |
| 5,661,998 | 9/1997 | Genise | 74/335 |
| 5,669,265 | 9/1997 | Adler | 74/335 |

*Primary Examiner*—Dirk Wright
*Attorney, Agent, or Firm*—Howard D. Gordon

[57] ABSTRACT

A robust control (10) for a pressurized-fluid-operated, three-position shift actuator piston assembly (12). The system requires only a single controlled source of pressurized fluid (44) to provide movement to and retention in a selected one of three axially displaced positions (D, N, OD). A solenoid-controlled valve (42) is controlled by pulse width modulation. Current applied to the solenoid coil is controlled (46), voltage (V) applied to the solenoid coil is sensed and used as a control parameter and/or a relatively light detent (48, 50) biases the assembly to a neutral (N) position to provide a robust control.

15 Claims, 5 Drawing Sheets

ROBUST CONTROL FOR THREE-POSITION TRANSMISSION SHIFT ACTUATOR ASSEMBLY

BACKGROUND OF THE INVENTION

1. Field of the Invention

The present invention relates to a robust control for a three-position actuator piston assembly of the type utilized to control the double-acting clutches of a change-gear transmission, such as the splitter clutches or range clutches of a compound transmission. In particular, the present invention relates to a robust control for a pressurized, fluid-actuated actuator piston assembly providing three selectable, maintainable positions (axially centered, axially displaced in a first direction, and axially displaced in a second direction) and requiring only a single controllable, variable pressure fluid supply device including a pulse-width-modulated, solenoid-controlled valve.

2. Description of the Prior Art

Change-gear mechanical transmissions having double-acting clutch mechanisms, of both the synchronized and non-synchronized types, are well known in the prior art, as may be seen by reference to U.S. Pat. Nos. 3,105,395; 3,335,616; 4,428,469; 4,754,665; 4,920,815; 4,944,197; 5,086,897; 5,370,013 and 5,390,561, the disclosures of which are incorporated herein by reference. Two-position and three-position, fluid-actuated, actuator piston assemblies and actuator systems associated therewith also are well known in the prior art, as may be seen by reference to U.S. Pat. Nos. 4,899,607; 4,928,544; 4,936,156; 5,054,591; 5,193,410; 5,263,379; 5,272,441 and 5,329,826, the disclosures of which are incorporated herein by reference.

A transmission utilizing a three-position splitter actuator and a splitter clutch having increased backlash is disclosed in U.S. Pat. No. 5,651,292, the disclosure of which is incorporated herein by reference.

A fluid pressure-operated, three-position shift actuator requiring only a single controlled source of pressurized fluid is disclosed in U.S. Pat. No. 5,661,998, the disclosure of which is incorporated herein by reference.

As described in U.S. Pat. No. 5,661,998, the three-position piston is used to achieve a mid-position or neutral state in which neither of the splitter gears is engaged. This neutral state allows the gear set that is being shifted to, to achieve a synchronized speed with the engaging member (the sliding clutch) and, as such, provides a much smoother shift.

This mid- or neutral position is obtained by applying a constant air pressure signal to the smaller piston face side of the splitter cylinder and a lower pressure to the larger piston face side. This lower pressure is achieved by pulse width modulating (PWM'ing) a solenoid valve that applies air pressure to the aft side of the piston. This PWM'ing entails rapidly turning a three-way, two-position, solenoid-controlled valve on and then off to achieve a pressure somewhere between zero psi and the full system pressure.

Testing of the prior art system has shown that the range of PWM values resulting in this neutral state is so small that it makes utilizing this method of control difficult for vehicular transmission applications. Operating variables such as temperature, voltage, pressure, contamination and manufacturing variations for both the solenoid valve and the splitter piston all play together to affect the range of PWM values that yield neutral.

SUMMARY OF THE INVENTION

In accordance with the present invention, the drawbacks of the prior art are minimized or overcome by the provision of a robust control for a relatively simple and inexpensive fluid-actuated three-position shift actuator piston assembly and actuator system which requires only a single controllable source of selectably variably pressurized fluid.

The foregoing is accomplished by modifying the prior art controls in at least one of the following manners:

(1) The voltage applied to the solenoid valve directly affects the valve response time and, as such, the PWM values that result in a neutral state. This valve response time can vary by more than a factor of 2 over the range of 9 to 18 VDC that the system must operate under. The robust control of the present invention, therefore, senses system voltage with the ECU and adjusts the valve PWM value so that the splitter will achieve a neutral state.

(2) The response time of the valve turning off is directly affected by the maximum current in the coil. The robust control of the present invention, therefore, employs a circuit in the ECU that rolls back the current in the coil of the solenoid valve to a lower and constant value, regardless of the voltage at the coil. By starting from the same point every time, the valve off times are very constant and, as such, the effects of coil current levels are greatly reduced.

(3) A spring-loaded plunger that fits into a notch in the splitter rod (or piston) is used to hold the splitter piston in neutral. This spring-loaded plunger or detent increases the range of PWM values that keeps the splitter in the neutral state by requiring additional force to move out of this state. The detent is designed such that it gives added force to hold the piston in neutral during PWM conditions but not so much force that it slows the response time for the cylinder as it moves from neutral into gear.

(4) The larger the flow orifice in the valve, the smaller the PWM range that will result in the neutral state for the splitter piston. This is because larger orifices flow so much air that the valve can only be open for a very short time before the pressure in the cylinder rises to a point that the splitter moves through neutral. Since the same valve that is used for the splitter piston also may be used for the range piston (one that requires high flow), the robust control of the present invention initially had a very small PWM range for neutral. An orifice was added between the splitter solenoid valve and the splitter piston to improve this situation. This significantly increased the PWM range to achieve neutral and allowed common valves to be used for the splitter and the range pistons.

By utlizing one or more of the features described above, an open loop control, more robust to the various system variations, is provided.

This and other objects and advantages of the present invention will become apparent from a reading of the following description of the preferred embodiment taken in connection with the attached drawings.

DESCRIPTION OF THE PREFERRED EMBODIMENT

Figure 2:
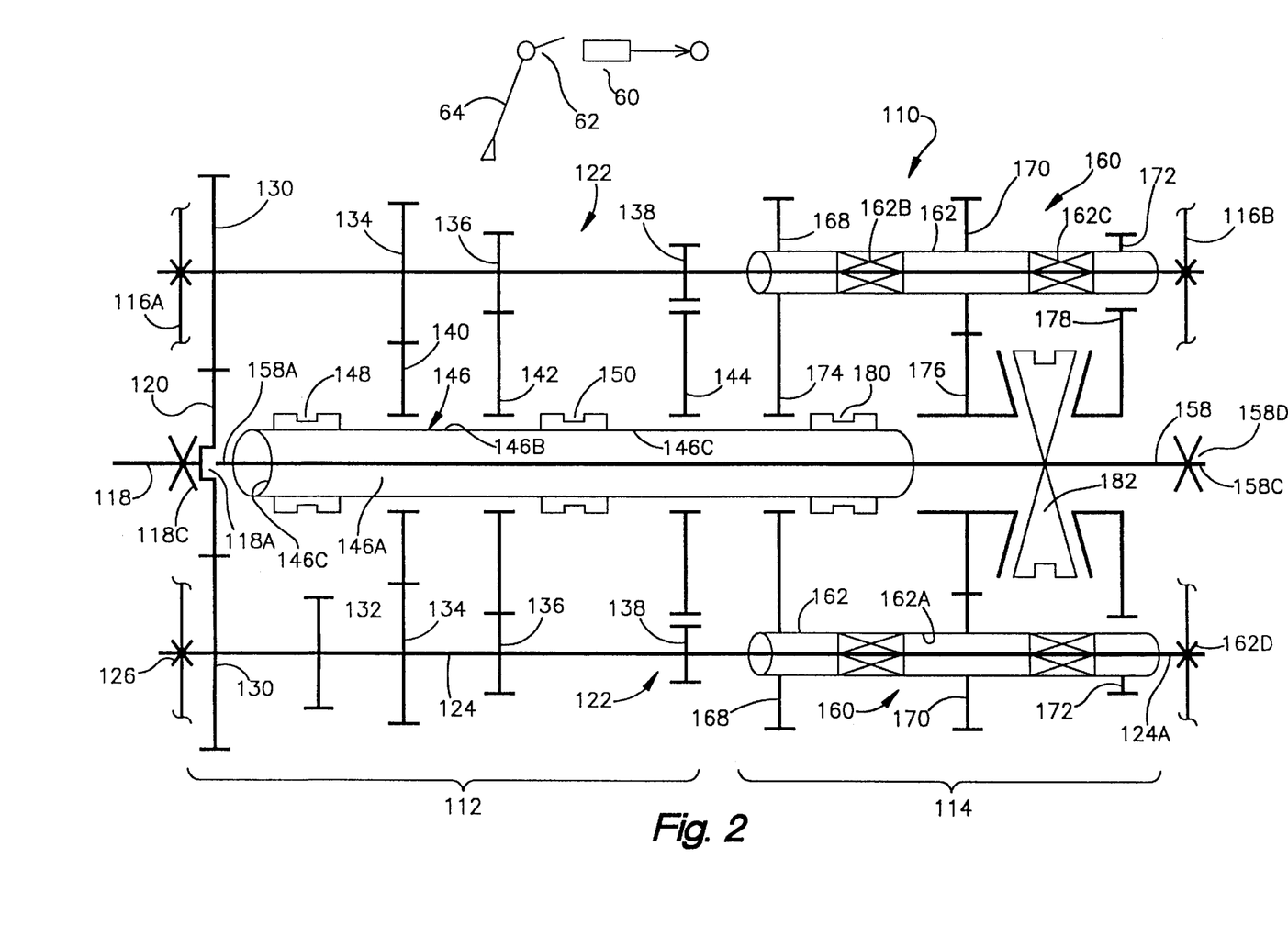
FIG. 2 is a schematic illustration of a compound transmission advantageously utilizing the actuator system of the present invention.

Certain terminology is used in the following description for convenience only and is not limiting. The words "upwardly," "downwardly," "rightwardly" and "leftwardly" will designate directions in the drawings to which reference is made. The words "forward" and "rearward" will refer respectively to the front and rear ends of the transmission as conventionally mounted in the vehicle, being respectively to the left and right sides of the transmission as illustrated in FIG. 2. The words "inwardly" and "outwardly" will refer respectively to directions toward and away from the geometric center of the device and designated parts thereof. Said terminology includes the words above specifically mentioned, derivatives thereof and words of similar import.

The term "compound transmission" is used to designate a change-speed or change-gear transmission having a main transmission section and an auxiliary drive train unit, such as an auxiliary transmission section, connected in series whereby the selected gear reduction in the main transmission section may be compounded by further selected gear reduction in the auxiliary transmission section. The term "upshift" as used herein shall mean the shifting from a lower speed gear ratio to a higher speed gear ratio, and the term "downshift" as used herein shall mean the shifting from a higher speed gear ratio to a lower speed gear ratio. The terms "low speed gear" or "low gear" as used herein shall designate a gear utilized for relatively low forward speed operation in a transmission (i.e., a set of gears having a higher ratio of reduction of output shaft speed relative to the speed of the input shaft). "Synchronized clutch assembly" and words of similar import shall designate a clutch assembly utilized to non-rotatably couple a selected gear to a shaft by means of a positive clutch in which attempted engagement of said clutch is prevented until the members of the clutch are at substantially synchronous rotation and relatively large capacity friction means are associated with the clutch members and are sufficient, upon initiation of a clutch engagement, to cause the clutch members and all members rotating therewith to rotate at a substantially synchronous speed.

Figure 3:
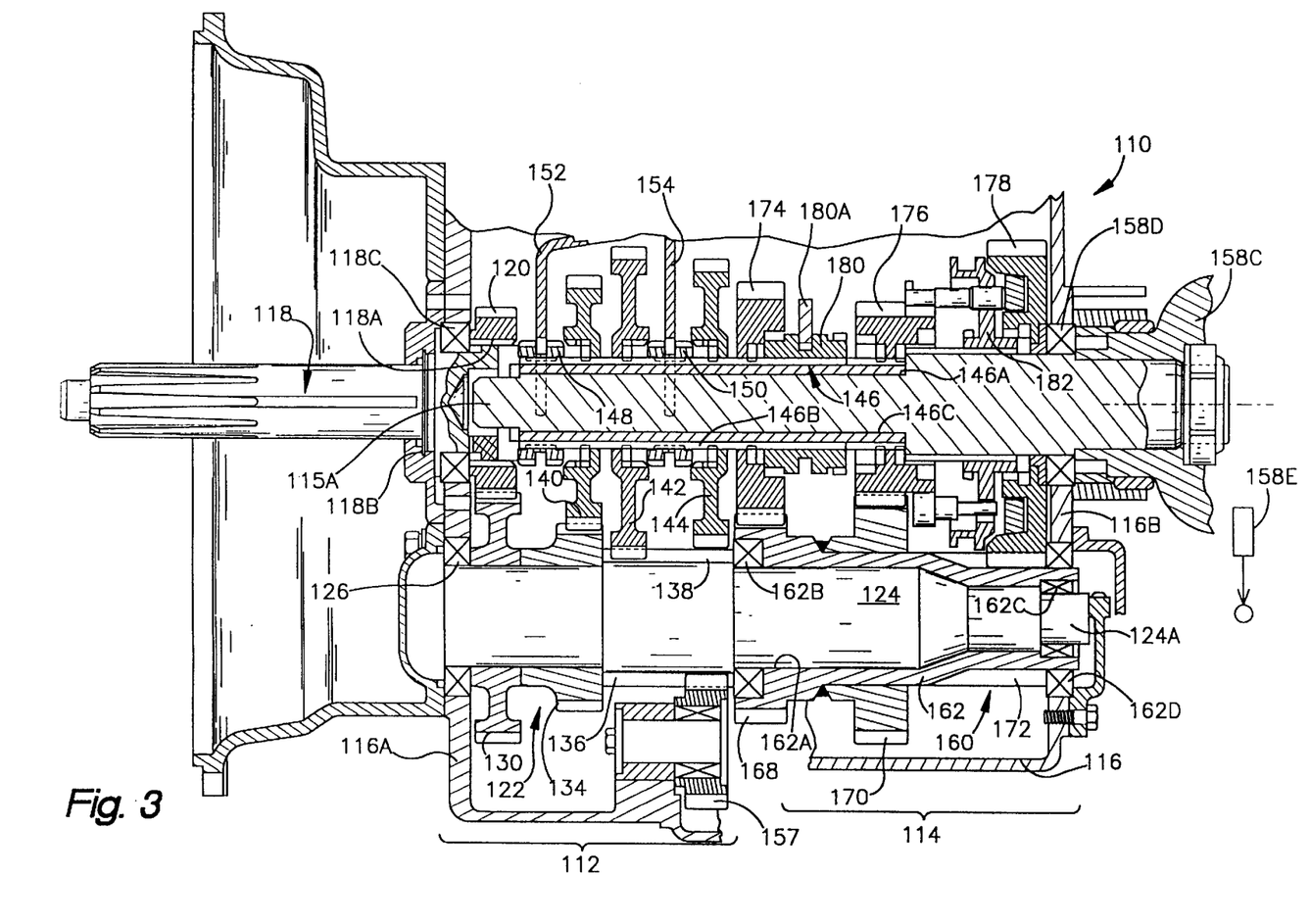
FIG. 3 is a sectional view of a preferred embodiment of the transmission of FIG. 2.
Figure 4:
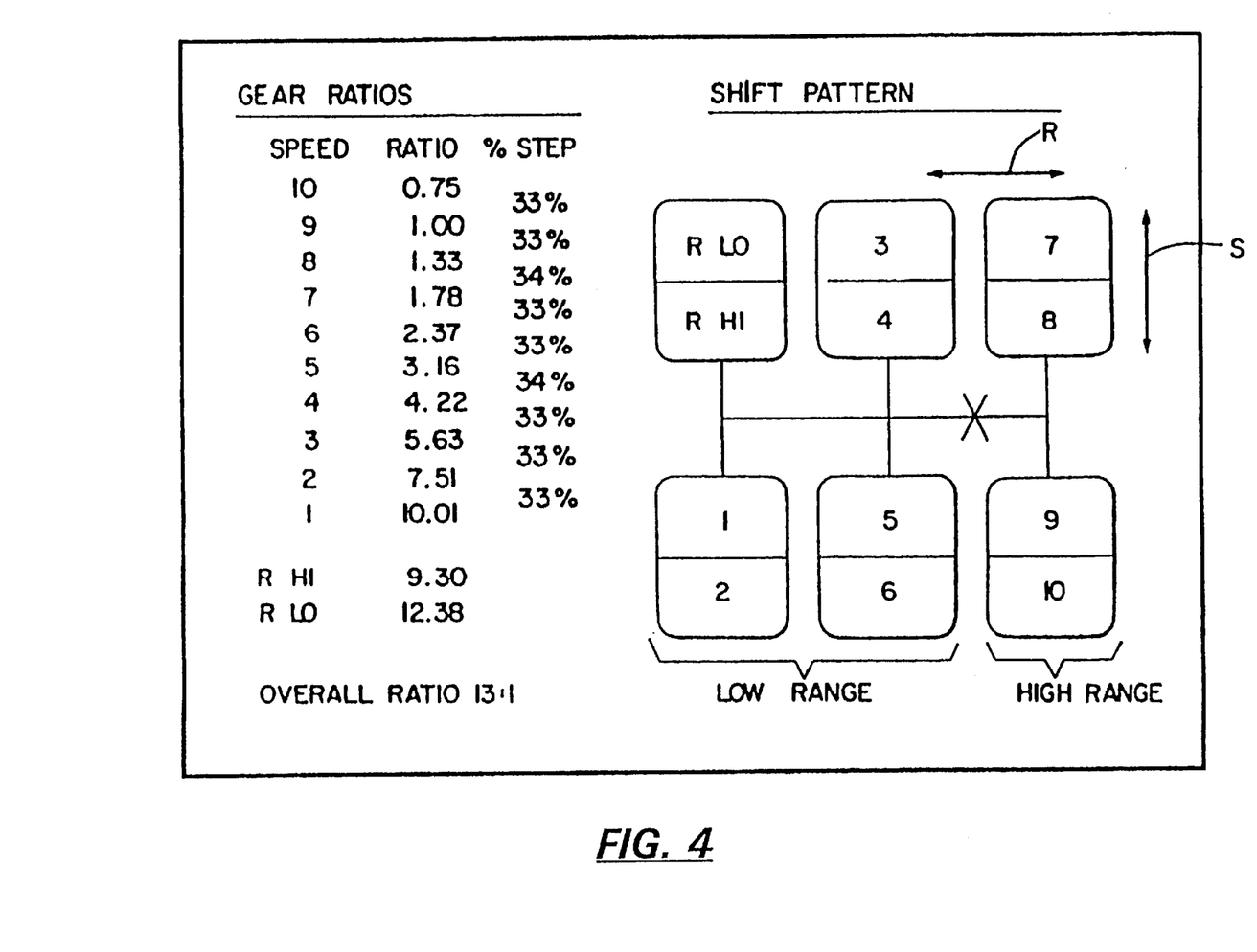
FIG. 4 illustrates a typical shift pattern and typical gear ratios for the transmission of FIG. 2.

The fluid-actuated, three-position shift actuator system 10 of the present invention, and the three-position actuator piston assembly 12 utilized therein, may be especially advantageously utilized as a splitter clutch actuator in a compound transmission 110, as illustrated in FIGS. 2–4.

Transmission 110 includes a mainsection 112 and an auxiliary section 114, both contained within housing 116. Housing 116 includes a forward end wall 116A and a rearward end wall 116B, but not an intermediate wall.

Input shaft 118 carries input gear 120 fixed for rotation therewith and defines a rearwardly opening pocket 118A wherein a reduced diameter extension 158A of output shaft 158 is piloted. A non-friction bushing 118B or the like may be provided in pocket or blind bore 118A. The forward end of input shaft 118 is supported by bearing 118C in front end wall 116A while the rearward end 158C of output shaft 158 is supported by bearing assembly 158D in rear and wall 116B. Bearing assembly 158D may be a pair of opposed taper bearings or a single roller or ball bearing as is illustrated in FIG. 3.

The mainshaft 146, which carries mainshaft clutches 148 and 150, and the mainshaft splitter clutch 180 is in the form of a generally tubular body 146A having an externally splined outer surface 146B and an axially extending through bore 146C for passage of output shaft 158. Shift forks 152 and 154 are provided for shifting clutches 148 and 150, respectively. Mainshaft 146 is independently rotatable relative to input shaft 118 and output shaft 158 and, preferably, is free for limited radial movements relative thereto.

The mainsection 112 includes two substantially identical mainsection countershaft assemblies 122, each comprising a mainsection counter-shaft 124 carrying countershaft gears 130, 132, 134, 136 and 138 fixed thereto. Gear pairs 130, 134, 136 and 138 are constantly meshed with input gear 118, mainshaft gears 140 and 142 and idler 157, which is meshed with reverse mainshaft gear 144, respectively.

Mainsection countershaft 124 extends rearwardly into the auxiliary section, where its rearward end 124A is supported directly or indirectly in rear housing end wall 116B.

The auxiliary section 114 includes two substantially identical auxiliary countershaft assemblies 160, each including an auxiliary countershaft 162 carrying auxiliary countershaft gears 168, 170 and 172 for rotation therewith. Auxiliary countershaft gear pairs 168, 170 and 172 are constantly meshed with splitter gear 174, splitter/range gear 176 and range gear 178, respectively. Splitter clutch 180 is fixed to mainshaft 146 for selectively clutching either gear 174 or 176 thereto, while synchronized range clutch 182 is fixed to output shaft 158 for selectively clutching either gear 176 or gear 178 thereto. Preferably, the splitter clutch is axially positioned by a shift fork 180A controlled by the actuator system 10 of the present invention.

Auxiliary countershafts 162 are generally tubular in shape defining a through bore 162A for receipt of the rearward extensions of the mainsection countershafts 124. Bearings or bushings 162B and 162C are provided to rotatably support auxiliary countershaft 162 on mainsection countershaft 124. Bearing 162D directly or indirectly supports the rear ends of countershafts 124 and 162 in the rear end wall 116B.

The structure and function of double-acting jaw clutch collar 180 is substantially identical to the structure and function of the sliding clutch collars 148 and 150 utilized in the main transmission section 112 and the function of double-acting synchronized clutch assembly 182 is substantially identical to the structure and function of prior art double-acting synchronized clutch assemblies, examples of which may be seen by reference to U.S. Pat. Nos. 4,462,489; 4,125,179 and 2,667,955, the disclosures of which are incorporated herein by reference. The synchronized clutch assembly 182 illustrated is of the pin type described in aforementioned U.S. Pat. No. 4,462,489.

When used in connection with the actuator system 10 of the present invention, the splitter jaw clutch 180 is a three-position clutch assembly which may be selectively positioned in the rightwardmost (direct) or leftwardmost (overdrive) positions for engaging either gear 176 or gear 174, respectively, to the mainshaft 146 or in an intermediate non-engaged (neutral) position. The neutral position refers to the range of intermediate positions of clutch 180 wherein neither gear 174 nor 176 is engaged to the mainshaft 146.

As may be seen by reference to FIGS. 2–4, by selectively axially positioning both the splitter clutch 180 and the range clutch 182 in the forward and rearward axial positions thereof, four distinct ratios of mainshaft rotation to output shaft rotation may be provided. Accordingly, auxiliary transmission section 114 is a three-layer auxiliary section of the combined range and splitter type providing four selectable speeds or drive ratios between the input (mainshaft 146) and output (output shaft 158) thereof. The mainsection 112 provides a reverse and three potentially selectable forward speeds. However, one of the selectable mainsection forward gear ratios, the low speed gear ratios associated with mainshaft gear 142, is not utilized in the high range. Thus, transmission 110 is properly designated as a "(2+1)×(2×2)" type transmission providing nine or ten selectable forward speeds, depending upon the desirability and practicality of splitting the low gear ratio.

The shift pattern for shifting transmission 110 is schematically illustrated in FIG. 4. Divisions in the vertical direction at each gear lever position signify splitter shifts, while movement in the horizontal direction from the ¾ and ⅚ leg of the H pattern to the ⅞ and ⁹⁄₁₀ leg of the H pattern signifies a shift from the low range to the high range of the transmission. As discussed above, splitter shifting is accomplished in the usual manner by means of a vehicle operator-actuated splitter button or the like, usually a button located at the shift lever knob, while operation of the range clutch shifting assembly is an automatic response to movement of the gear shift lever between the central and rightwardmost legs of the shift pattern, as illustrated in FIG. 6. Range shift devices of this general type are known in the prior art and may be seen by reference to U.S. Pat. Nos. 3,429,202; 4,455,883; 4,561,325; 4,663,725 and 4,974,468, the disclosures of which are incorporated herein by reference.

Referring again to FIG. 4, and assuming that it is desirable that a transmission have generally equal ratio steps, the mainsection ratio steps should be generally equal, the splitter step should be generally equal to the square root of the mainsection ratio steps, and the range step should equal about the mainsection ratio step raised to the $N^{th}$ power, where N equals the number of mainsection ratio steps occurring in both ranges (i.e., N=2 in the (2+1)×(2×2) transmission 110). Given the desired ideal ratios, gearing to approximate these ratios is selected. In the above example, the splitter steps are about 33.3%, while the range step is about 316%, which generally is suitable for a "2+1" main transmission section having about 78% steps, as the square root of 1.78 equals about 1.33, and 1.78 raised to the second power (i.e., N=2) equals about 3.16.

For certain at least partially automated mechanical transmission systems utilizing mechanical transmissions similar to transmission 110 illustrated in FIGS. 2–4, it may be desirable under certain operating conditions to cause the splitter jaw clutch 180 to move to and remain in the neutral position thereof and/or to vary the force applied to the shift fork 180A and clutch 180. The shift actuator piston assembly 12 and actuator system 10 of the present invention provides a relatively simple, inexpensive and reliable means to provide these desirable splitter clutch control features.

Figure 1:
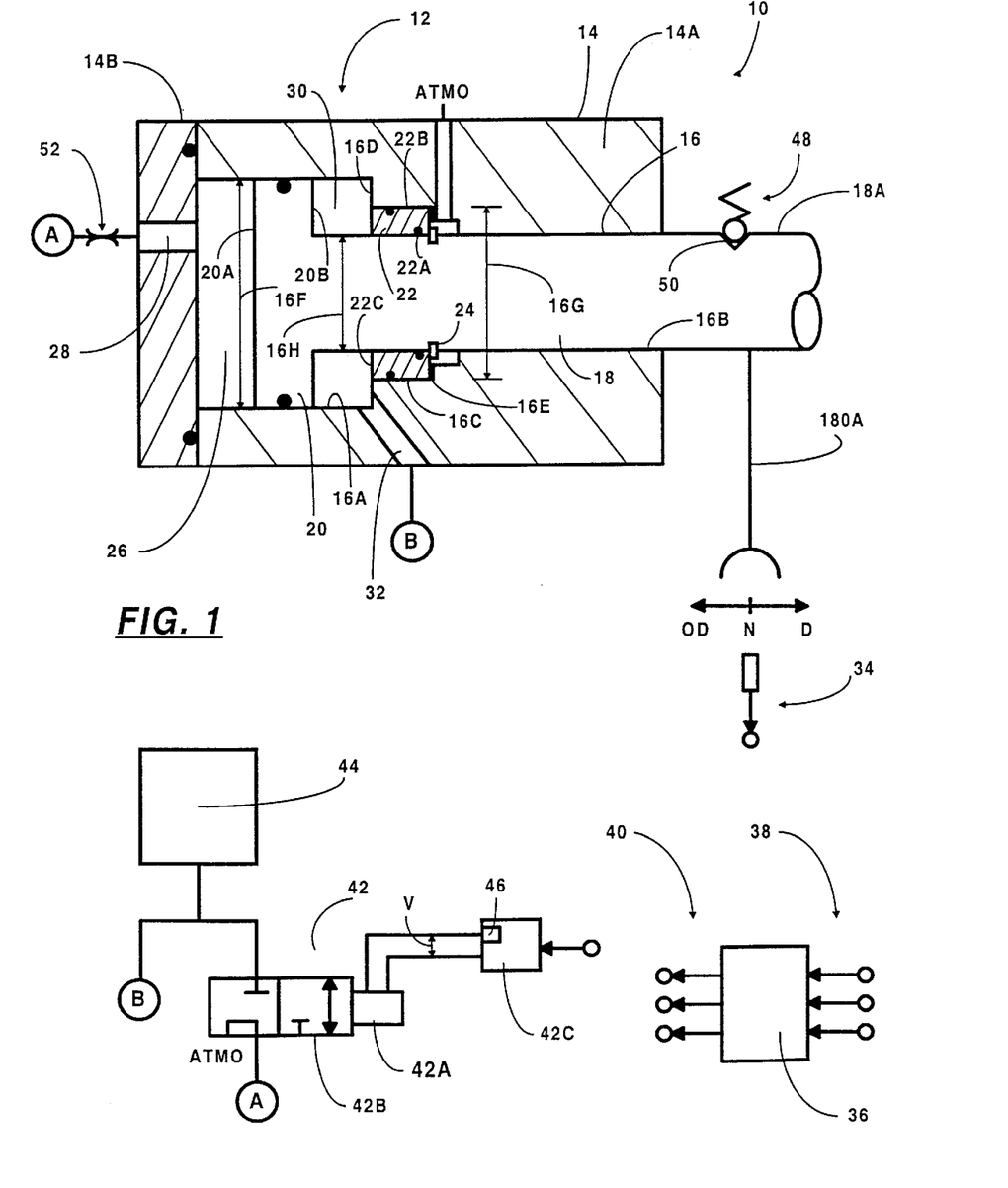
FIG. 1 is a schematic illustration of the fluid-actuated, three-position shift actuator system of the present invention.

Referring to FIG. 1, the fluid-actuated, three-position actuator piston assembly 12 includes a two-piece cylinder body 14, including a main body piece 14A and an end cap 14B. The cylinder body defines a blind bore 16 from which extends a piston shaft 18 carrying a shift actuator such as the shift fork 180A for axial movement therewith. The blind bore 16 includes an enlarged interior diameter portion 16A, a reduced interior diameter portion 16B, and an intermediate interior diameter portion 16C interposed between the large and small interior diameter portions. Shoulders 16D and 16E, respectively, are defined at the intersections of bore portions 16A and 16C and of bore portions 16C and 16B, respectively. By way of example, for a heavy-duty transmission, the interior diameters 16F, 16G and 16H of bore portions 16A, 16B and 16C, respectively, may be about 2.203 inches, 1.197 inches and 1.850 inches, respectively.

An enlarged differential area piston member 20 is slidably and sealingly received in enlarged bore portion 16A and is fixed to shaft 18 for axial movement therewith. Piston 20 defines a leftward-facing large face 20A and a rightward-facing smaller face 20B.

Shaft 18 is slidably received in smaller diameter bore portion 16B and carries an annular, tubular piston member 22 on the outer diameter surface 18A thereof. Annular, tubular piston member 22 defines an interior diameter surface 22A slidably and sealingly carried by the outer diameter surface 18A of shaft 18 and an outer diameter surface 22B slidably and sealingly received in intermediate diameter portion 16C. The tubular piston also defines a leftward-facing piston face 22C.

Although shaft 18 is illustrated in connection with shift yoke 180A, it also may be utilized to operate other devices such as shift mechanisms of the types illustrated in U.S. Pat. No. 4,920,815.

Rightward axial movement of the annular, tubular piston 22 relative to shaft 18 is limited by stop member 24, while leftward axial movement of the piston 22 relative to shaft 18 is limited by piston face 20B. Rightward axial movement of tubular piston 22 relative to bore 16 and body 14 is limited by shoulder 16E. Piston face 20A and bore portion 16A define a first chamber 26 connected by passage 28 to a selectably pressurized and exhausted fluid conduit A, while piston face 20B, bore piston 16A and the leftward face 22C of tubular secondary piston 22 define a second chamber 30 connected by passage 32 to a constantly pressurized conduit B.

A position sensor 34 may be provided to provide an input signal indicative of the axial position of shaft 18 and/or shift yoke 180A. As is illustrated, shift yoke 180A may be fully leftwardly displaced to engage the overdrive splitter ratio (i.e., gear 174 engaged to mainshaft 146), fully rightwardly displaced to engage the direct drive splitter ratio (i.e., gear 176 engaged to mainshaft 146), or centered in a neutral position area (mainshaft 146 not engaged to either gears 174 or 176).

A microprocessor-based controller 36 may be provided to receive various input signals 38 which are processed according to predetermined logic rules to issue command output signals 40 to various system actuators, such as the pulse-width-modulated, solenoid-controlled valve assembly 42 used to control the pressurization and exhaust of conduit A and piston chamber 26. Controllers of this type are known in the prior art, as may be seen by reference to U.S. Pat. Nos. 4,360,060; 4,595,986; 5,281,902 and 5,445,126, the disclosures of which are incorporated herein by reference.

A source of onboard filtered and regulated air 44, usually from the vehicle compressor, is constantly connected directly to chamber 30 through conduit B and passage 32 in body 14. The chamber 26 is selectably connected by conduit A and passage 38 to the source 44 or to atmosphere (ATMO), depending upon the position of the three-way, two-position pulse-width-modulated, solenoid-controlled valve assembly 42. In a typical heavy-duty vehicle, the source of pressurized air 44 will be regulated at about 80 psi.

The microprocessor-based controller 36 may receive input signals from an electronic data link, such as those conforming to industry-established protocols such as SAE J1922, SAE J1939 and/or ISO11898 and/or from various sensors such as sensors indicative of throttle pedal position, vehicle speed, transmission shaft speed, engine speed, engine torque, shift lever and/or splitter selector manipulation, master clutch condition and the like. The controller 36 also may issue command output signals 40 to display devices, transmission main section and/or range section actuators, engine controllers, master clutch operators, driveline retarder operators and the like. The controller 36 also may issue command output signals to pulse-width-modulated, solenoid-controlled valve assembly 42.

A sensor 158E may be provided to provide a signal indicative of the rotational speed of output shaft 158 (also indicative of vehicle speed), and a sensor 60 may be provided to provide a signal indicative of operation of the splitter selector switch 62 located on the shift lever 64.

It is important to note that when piston shaft 18/shift yoke 180A is in the neutral position and tubular piston 22 is on stop 24 (which is the natural consequence of constantly pressurizing chamber 30), then tubular piston 22 will be in contact with shoulder 16E. Accordingly, if the shaft 18/yoke 180A is displaced in the overdrive (leftward) direction, the face 22C of piston 22 will apply a rightward force on the shaft and yoke (about 130 pounds in the current example), which force will abruptly cease as the shaft 18/yoke 180A moves to neutral or to the direct drive (rightward) direction from neutral. This behavior is utilized to control positioning of the three-position actuator 12, as will be described in greater detail below.

Figure 5:
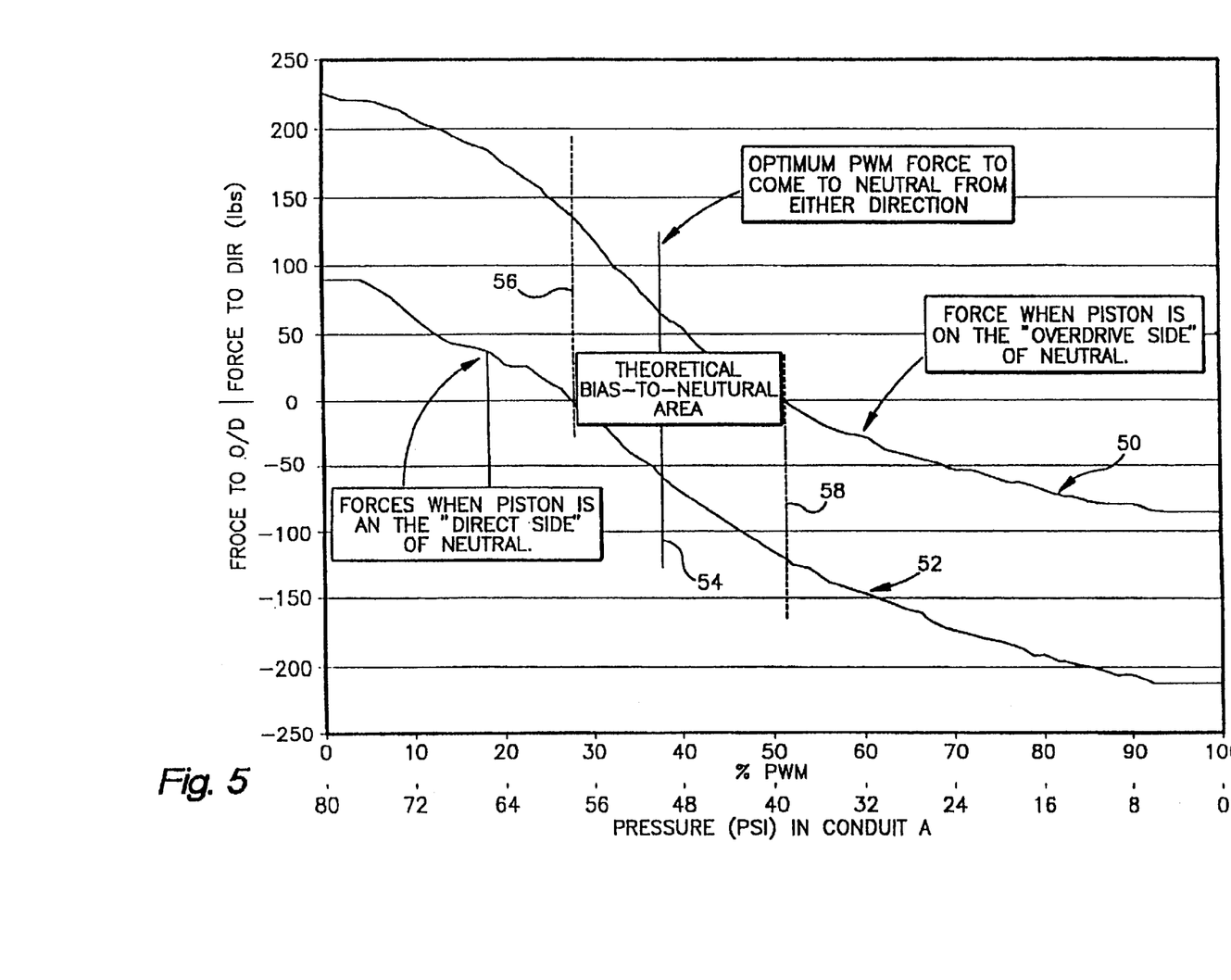
FIG. 5 is a graphic representation of variable force applied by the actuator assembly of the present invention in response to variable pulse width modulation of the single controlled supply valve or variable fluid pressure provided thereby to the first chamber.

FIG. 5 is a graphic representation of the forces applied to the shift yoke 180A at various degrees of pulse width modulation, depending on the positioning of the yoke, and assuming the dimensions set forth above, and an 80-psi source of pressurized fluid (i.e., 20A=2.203 inches; 20B= 1.197 inches; 20C=1.850 inches; and source 44=80 psi). In FIG. 5, the percentage of pulse width modulation (% PWM) varies from 0% modulation (fully energized) to 100% modulation (energized none of the time), and positive force is in the direct (rightward) direction, while negative force is in the overdrive (leftward) direction. Line 50 represents the forces applied to the yoke if the yoke is displaced to the overdrive (rightward) direction of neutral, while line 52 represents the forces applied to the yoke if the yoke is displaced to the direct (leftward) direction of neutral. At any given level of pulse width modulation of solenoid-controlled valve 42, or in the corresponding resulting pressurization of conduit A, the difference between lines 50 and 52 is the approximately 130 pounds of force to the right which the tubular piston will provide if the yoke 180A is located to the left (overdrive) side of neutral.

By way of example, if engaged in overdrive, if a 0% modulation (i.e., full energization) of solenoid-controlled valve 42 is commanded, the yoke will be biased from the overdrive position toward neutral with about 220 pounds of force until reaching neutral (line 50) and then will be biased with about 90 pounds of force from neutral to the direct position (line 52). Similarly, at 20% modulation (i.e., valve energized 80% of time), the yoke will be urged toward neutral with about 170 pounds of force and then from neutral into direct with about 40 pounds of force.

As represented by line 54, at about 38% modulation (i.e., valve solenoid energized 62% of time), regardless of the position of the yoke, the yoke will be biased toward neutral with about 65 pounds of force and then abruptly stopped in the neutral position. Theoretically, at about 28% modulation (line 56) to about 52% modulation (line 58), the yoke will be biased to neutral with various amounts of force and will remain in or near the neutral position.

Accordingly, using the three-position actuator system 10 of the present invention, requiring only a single pulse-width-modulation-controlled, solenoid-controlled valve assembly 42, an actuator having three selectable and maintainable positions and selectably variable actuation forces is provided.

In the illustrated system, a modulation of 0% to about 28% will result in the actuator shifting to the direct position, a modulation of about 28% to 52% will result in the actuator shifting to neutral, and a modulation of about 52% to 100% will result in the actuator shifting to the overdrive position. Alternatively, the same results may be obtained by simply providing a variable source of pressure to conduit A by a source selectably variable between 0 psi and 80 psi. The operating characteristics of system 10 may be varied, as required, by varying the relative effective areas of the piston faces 20A, 20B and 22C.

The valve assembly 42 includes a solenoid 38A for controlling the positioning of two-position valve member 38B. A solenoid controller 38C, operated by command signals 40 from ECU 36, is provided to selectively energize and deenergize the coils of the solenoid 42A from an onboard source (not shown) of electrical power, such as a battery or alternator. All or part of controller 42C may be integral with ECU 32. The valve may be of the structure illustrated in aforementioned U.S. Pat. No. 5,661,998.

The voltage V applied to the solenoid valve 42 directly affects the valve response time and, as such, the PWM values that result in a neutral state. This valve response time can vary by more than a factor of 2 over the range of 9 to 18 VDC that a typical onboard system must operate under. System voltage V is sensed by controller 42C and provided to the ECU 36 to adjust the valve PWM value so that the splitter will achieve a neutral state. The control of solenoid 42A, thus, is done as a variable function of sensed voltage V applied to the solenoid. In particular, response times (and, thus, required lead times) are considered to vary inversely with sensed voltage.

The response time of the valve turning off is directly affected by the maximum current in the coil. A circuit 46 is employed in the ECU and/or controller 42C that rolls back the current in the coil of the solenoid valve to a lower and constant value, regardless of the voltage at the coil. By starting from the same point every time, valve off times are very constant and, as such, the variable effects of coil current levels are greatly reduced.

A spring-loaded plunger 48 that fits into a notch 50 in the splitter rod 18 or piston is used to hold the splitter piston 20 in neutral. This spring-loaded plunger or detent increases the range of PWM values that keep the splitter in the neutral state by requiring additional force to move out of this state. The detent is designed such that it gives added force to hold the piston in neutral during PWM conditions but not so much force that it slows the response time for the cylinder as it moves from neutral into gear.

The larger the flow orifice in the valve and/or conduits, the smaller the PWM range that will result in the neutral state for the splitter piston. This is because larger orifices flow so much air that the valve can only be open for a very short time before the pressure in the cylinder rises to a point that the splitter moves through neutral.

Since the same valve 42B used for the splitter piston also may be used for the range piston (one that requires high flow, if required), an orifice or restriction 52 was added between the splitter solenoid valve 42B and the splitter piston chamber 26 to improve this situation. This significantly increases the PWM range to achieve neutral and allows common valves to be used for the splitter and the range pistons.

Although the preferred embodiment of the present invention has been described with a certain degree of particularity, various changes to form and detail may be made without departing from the spirit and scope of the invention as hereinafter claimed.

We claim:

1. A robust control for a pressurized-fluid-operated, three-position shift actuator assembly for selectably positioning a double-acting clutch in a selectable one of a neutral position, a first engaged position axially offset said neutral position in a first axial direction, or a second engaged position axially offset said neutral position in a second axial direction opposite said first axial direction, said shift actuator assembly comprising:

a shift member operatively associated with said clutch;

a differential area piston fixed for axial movement with said shift member, said differential area piston having a larger face exposed to pressurized fluid in a selectably, variably pressurized first chamber and an opposed smaller face exposed to pressurized fluid in a constantly pressurized second chamber, pressurized fluid on said larger face causing a force urging said piston in said first axial direction and pressurized fluid on said smaller face causing a force urging said piston in said second axial direction;

a two-position, solenoid-controlled valve assembly for selectively connecting said first chamber to a source of pressurized fluid or to an exhaust, said valve assembly including a solenoid coil and a valve controller for applying pulse-width-modulated electrical energy to said coil; and a control unit for receiving input signals and processing same according to predetermined logic rules to issue command output signals to actuators including said valve controller;

said control characterized by at least one of:

(i) means to sense the voltage (V) appiled to said solenoid coil and to control the valve controller as a variable function of sensed voltage; and (ii) means to regulate the current applied to said solenoid coil.

2. The robust control of claim 1 further characterized by a detent member for resiliently biasing said piston to position said clutch in the neutral position thereof.

3. The robust control of claim 1 wherein said second chamber is constantly pressurized to a regulated pressure and said first chamber is selectably pressurized to a variable pressure having a maximum value no greater than said regulated pressure.

4. The robust control of claim 2 wherein said second chamber is constantly pressurized to a regulated pressure and said first chamber is selectably pressurized to a variable pressure having a maximum value no greater than said regulated pressure.

5. The robust control of claim 1 wherein said shift member is a shift yoke engageable to said clutch.

6. The robust control of claim 5 wherein said shift yoke is fixed to a shaft carried by said piston.

7. The robust control of claim 1 wherein said control unit controls said valve controller as a function of response times of said valve, said response times variable with sensed voltage applied to said solenoid coil.

8. The robust control of claim 2 wherein said control unit controls said valve controller as a function of response times of said valve, said response times variable with sensed voltage applied to said solenoid coil.

9. A compound, splitter-type, mechanical transmission (110) comprising a double-acting splitter jaw clutch (180) for engaging a selected one of two splitter gears (174, 176) to a shaft (146) and a pressurized-fluid-operated, three-position shift actuator assembly (12) for selectably positioning said clutch in a selectable one of a neutral (N) position, a first engaged position (D) axially offset said neutral position in a first axial direction for engaging one of said splitter gears, or a second engaged position (OD) axially offset said neutral position in a second axial direction opposite said first axial direction for engaging the other of said splitter gears, said shift actuator assembly comprising:

a shift mechanism (18, 180A) operatively associated with said clutch (180);

a differential area piston (20) fixed for axial movement with said shift mechanism, said differential area piston having a larger face (20A) exposed to pressurized fluid in a selectably, variably pressurized first chamber and an opposed smaller face (20B) exposed to pressurized fluid in a constantly pressurized second chamber, pressurized fluid on said larger face causing a force urging said piston in said first axial direction and pressurized fluid on said smaller face causing a force urging said piston in said second axial direction; and a two-position, solenoid-controlled splitter valve assembly (42) for selectively connecting said first chamber to a source of pressurized fluid or to an exhaust (ATMO), said assembly including a solenoid coil (42A) and a valve controller (42C) for applying pulse-width-modulated electrical energy to said coil; and a control unit (36) for receiving input signals (38) and processing same according to predetermined logic rules to issue command output signals (40) to actuators including said valve controller;

said transmission characterized by at least one of:

(i) means to sense the voltage (V) appiled to said solenoid coil and to control the valve controller as a variable function of sensed voltage; and (ii) means (46) to regulate the current applied to said solenoid coil.

10. The transmission of claim 8 further characterized by a detent member (48, 50) for resiliently biasing said piston to position said clutch in the neutral position thereof.

11. The transmission of claim 8 wherein said second chamber is constantly pressurized to a regulated pressure (80 psi) and said first chamber is selectably pressurized to a variable pressure having a maximum value no greater than said regulated pressure.

12. The transmission of claim 8 wherein said shift member is a shift yoke (180A) engageable to said clutch.

13. The transmission of claim 9 wherein said shift member is a shift yoke engageable to said clutch.

14. The transmission of claim 8 further comprising a range section controlled by a two-position range valve substantially identical to said two-position splitter valve, a flow restriction (52) interposed said first chamber and said first two-position splitter valve.

15. A vehicular transmission system (10) comprising:

a compound, splitter-type, mechanical transmission (110) comprising a double-acting splitter jaw clutch (180) for engaging a selected one of two splitter gears (174, 176) to shaft (146), a pressurized-fluid-operated, three-position shift actuator assembly (12) for selectably positioning said clutch in a selectable one of a neutral (N) position, a first engaged position (D) axially offset said neutral position in a first axial direction for engaging one of said splitter gears, or a second engaged position (OD) axially offset said neutral position in a second axial direction opposite said first axial direction for engaging the other of said splitter gears, said shift actuator assembly comprising a shaft (18) operatively associated with said clutch (180A/180); a differential area piston (20) fixed for axial movement with said shaft, said differential area piston having a larger face (20A) exposed to pressurized fluid in a selectably, variably pressurized first chamber and an opposed smaller face (20B) exposed to pressurized fluid in a constantly pressurized second chamber, pressurized fluid on said larger face causing a force urging said shaft in said first axial direction and pressurized fluid on said smaller face causing a force urging said shaft in said second axial direction;

an onboard source of regulated, compressed air (44B) regulated to a predetermined regulation pressure connected directly to said second chamber (30);

a two-position, solenoid-controlled valve assembly (42) for selectively connecting said first chamber to said source of pressurized fluid or to an exhaust (ATMO), said valve having a first position for connecting said source of regulated, pressurized, compressed air to said first chamber, and a second position for connecting said first chamber to an exhaust to atmosphere (ATMO), said assembly including a solenoid coil (42A) and a valve controller (42C) for applying pulse-width-modulated electrical energy to said coil; and a control unit for receiving input signals and processing same according to predetermined logic rules to issue command output signals to actuators including said valve controller;

said system characterized by at least one of:
  (i) means to sense the voltage (V) appiled to said solenoid coil and to control the valve controller as a variable function of sensed voltage; and
  (ii) means (46) to regulate the current applied to said solenoid coil.

* * * * *